United States Patent
Cartier et al.

(10) Patent No.: US 7,423,080 B2
(45) Date of Patent: Sep. 9, 2008

(54) RADIATION CROSSLINKING OF HALOGEN-FREE FLAME RETARDANT POLYMER

(75) Inventors: Hervé Cartier, Bellefontaine (FR); Alexis Chopin, Saint Maximin (FR); Carlo Perego, Dalmine (IT)

(73) Assignee: Sabic Innovative Plastics IP B.V. (NL)

( * ) Notice: Subject to any disclaimer, the term of this patent is extended or adjusted under 35 U.S.C. 154(b) by 448 days.

(21) Appl. No.: 10/940,337

(22) Filed: Sep. 14, 2004

(65) Prior Publication Data

US 2006/0058431 A1   Mar. 16, 2006

(51) Int. Cl.
*C08K 5/5313* (2006.01)
(52) U.S. Cl. .................. 524/126; 524/99; 524/100; 524/101; 524/133
(58) Field of Classification Search ........... 524/99–101, 524/126, 133
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,465,319 A | 3/1949 | Whinfield et al. | |
| 2,512,606 A | 6/1950 | Bolton et al. | |
| 3,047,539 A | 7/1962 | Pengilly | |
| 3,814,869 A | 6/1974 | De Luca | |
| 3,847,867 A | 11/1974 | Heath et al. | |
| 3,850,885 A | 11/1974 | Takekoshi et al. | |
| 3,852,242 A | 12/1974 | White | |
| 3,855,178 A | 12/1974 | White et al. | |
| 3,884,882 A | 5/1975 | Caywood, Jr. | |
| 3,953,404 A | 4/1976 | Borman | |
| 3,983,093 A | 9/1976 | Williams, III et al. | |
| 4,147,740 A | 4/1979 | Swiger et al. | |
| 4,174,358 A | 11/1979 | Epstein | |
| 4,180,495 A | 12/1979 | Sandler | |
| 4,208,321 A | 6/1980 | Sandler | |
| 4,208,322 A | 6/1980 | Sandler | |
| 4,251,644 A | 2/1981 | Joffrion | |
| 4,346,194 A | 8/1982 | Roura | |
| 4,360,616 A | 11/1982 | Pagilagan | |
| 4,474,927 A | 10/1984 | Novak | |
| 4,831,071 A | 5/1989 | Ward et al. | |
| 5,093,395 A * | 3/1992 | Torisu | 524/99 |
| 5,439,719 A | 8/1995 | Grosse-Puppendahl et al. | |
| 5,618,865 A | 4/1997 | Martens et al. | |
| 5,708,065 A | 1/1998 | Martens et al. | |
| 5,780,534 A | 7/1998 | Kleiner et al. | |
| 6,013,707 A | 1/2000 | Kleiner et al. | |
| 6,166,114 A | 12/2000 | Cosstick et al. | |
| 6,171,654 B1 | 1/2001 | Salsman et al. | |
| 6,255,371 B1 | 7/2001 | Schlosser et al. | |
| 6,365,071 B1 | 4/2002 | Jenewein et al. | |
| 6,407,200 B1 | 6/2002 | Singh et al. | |
| 6,433,045 B1 * | 8/2002 | Hanabusa et al. | 524/100 |
| 6,437,084 B1 | 8/2002 | Birsak et al. | |
| 6,531,530 B2 | 3/2003 | Asano | |
| 6,547,992 B1 | 4/2003 | Schlosser et al. | |
| 2004/0021135 A1 | 2/2004 | Steenbakkers-Menting et al. | |
| 2004/0116651 A1 | 6/2004 | Van Den Bergen | |
| 2004/0227130 A1 | 11/2004 | Hoerold et al. | |
| 2005/0101708 A1 | 5/2005 | Knop et al. | |
| 2005/0143503 A1 | 6/2005 | Bauer et al. | |
| 2005/0250885 A1 | 11/2005 | Mercx et al. | |

FOREIGN PATENT DOCUMENTS

| | | |
|---|---|---|
| EP | 0139893 | 5/1985 |
| EP | 0919591 | 6/1999 |
| EP | 899296 | 11/2002 |
| EP | 1115789 | 10/2003 |
| WO | WO 97/39053 | 10/1997 |
| WO | 0228953 | 4/2002 |

OTHER PUBLICATIONS

JP 2003-327726A2—Abstract only.
JP 02-196856A2—Abstract only.
JP 59-012936A2—Abstract only.
Feng et al., "Radiation Physics and Chemistry", 63, pp. 493-496 (2002).
http://www.fire-testing.com/html/instruments/ul94ad.htm.
"Preparation and Reactions od Epoxy-Modified Polyethylene", J. Appl. Poly. Science, vol. 27, pp. 425-437 (1982).
EP899296 B1 -Abstract only.
Under Writers Laboratories Inc., Bulletin 94, "Tests for Flammability of Plactic Materials for Parts in Devices and Appliances, UL94".
International Search Report for International Application No. PCT/US2006/007657, mailed Jul. 12, 2007, 6 pages.
Written opinion for International Search Report for International Application No. PCT/US2006/007657, mailed Jul. 12, 2007, 8 pages.
Japanese Publication No. 57212216, Published Dec. 27, 1982, Abstract Only, 1 page.

* cited by examiner

*Primary Examiner*—Peter Szekely
(74) *Attorney, Agent, or Firm*—Cantor Colburn LLP

(57) ABSTRACT

Crosslinkable, flame retardant polymer compositions are provided containing a polyamide or polyester; a flame retardant system; and a crosslinking agent.

20 Claims, No Drawings

RADIATION CROSSLINKING OF HALOGEN-FREE FLAME RETARDANT POLYMER

BACKGROUND OF INVENTION

Crosslinked polyamide compositions are known in the art (See, W. Feng et al., "Radiation Physics and Chemistry", 63, pp. 493-496 (2002)). Japanese published application 59-012936A2 describes a crosslinked polyamide resin obtained by exposing a polyamide resin containing a crosslinker to a radiation beam. The resin can be free of glass fiber, and a flame retardant or filler can be incorporated into the resin.

Japanese published application 02-196856A2 describes a crosslinking flame-resistant polyamide composition prepared by compounding a polyamide with a brominated, crosslinkable styrenic resin and a multifunctional monomer and, if necessary, a flame resistance auxiliary. The multifunctional monomer can be triallyl cyanurate or triallyl isocyanurate. The polyamide resin composition is crosslinked with an ionizing radiation.

Japanese published application 2003-327726A2 describes a resin composition comprising a polyamide resin, a multifunctional monomer, a bromine-based flame retardant, an antimony-based flame retardant auxiliary, and hydrotalcite. The crosslinked polyamide resin molding is formed by irradiation crosslinking with an ionizing radiation.

Crosslinked polyamide materials can be used as a cost-effective replacement for thermosets or high temperature resistant polymers. The materials can be used for articles and parts for electronics and electrical applications where good short-term heat resistance is needed and are which are not met by regular flame retardant polyamide compositions. Exemplary applications include contact holders in electrical contactors and lead free soldering connectors. These applications often require the composition to possess properties such as high short-term heat resistance, good flame retardant properties, good mechanical properties, and good arc tracking resistance. Although there are known crosslinked polyamide materials, none have been able to meet all of the stringent requirements needed for electronic applications.

Accordingly, there remains a need in the art for halogen-free flame retardant crosslinked polymer compositions that exhibit good flame retardant properties, good electrical performance such as arc tracking resistance, while at the same time retaining good mechanical properties.

BRIEF DESCRIPTION OF THE INVENTION

One or more of the described drawbacks and disadvantages described above may be alleviated by a flame retardant polymer composition comprising a polyamide or polyester; a crosslinking agent; and a flame retardant system comprising a metal phosphinate salt, a metal diphosphinate salt, or combination thereof.

In another embodiment, flame retardant composition comprises a polyamide or polyester; 1 to about 20 weight percent of a polyallylic compound or a polyol poly(meth)acrylate crosslinking agent; about 5 to about 60 weight percent of glass fiber; and about 5 to about 25 weight percent of a flame retardant system comprising i) a metal phosphinate salt, a metal diphosphinate salt, or a combination thereof; and optionally ii) at least one nitrogen compound selected from the group consisting of condensation products of melamine and/or reaction products of condensation products of melamine with phosphoric acid, and/or mixtures thereof, melam, melem, melon, melamine cyanurate, melamine phosphate compounds, dimelamine phosphate, melamine pyrophosphate, benzoguanamine compounds, terepthalic ester compounds of tris(hydroxyethyl)isocyanurate, allantoin compounds, glycoluril compounds, ammeline, ammelide, and combinations thereof; wherein all the amounts are based upon the total weight of the composition.

In yet another embodiment, a method of forming a crosslinkable, flame retardant composition comprises blending a polyamide or polyester, a crosslinking agent; and a flame retardant system comprising i) a metal phosphinate salt, a metal diphosphinate salt, or combination thereof; and optionally ii) at least one nitrogen compound selected from the group consisting of condensation products of melamine and/or reaction products of condensation products of melamine with phosphoric acid, and/or mixtures thereof, melam, melem, melon, melamine, melamine cyanurate, melamine phosphate compounds, dimelamine phosphate, melamine pyrophosphate, melamine polyphosphate compounds, benzoguanamine compounds, terepthalic ester compounds of tris(hydroxyethyl)isocyanurate, allantoin compounds, glycoluril compounds, ammeline, ammelide, and combinations thereof, to form an intimate blend.

DETAILED DESCRIPTION

As described herein, crosslinkable polyamide or polyester compositions comprising a halogen-free flame retardant system based on a phosphinate metal salt and/or a diphosphinate metal salt, optionally in combination with a nitrogen compound show excellent radiation crosslinking in the presence of a crosslinking agent to provide crosslinked polymer compositions. The crosslinked polyamides exhibit excellent flame retardant, physical, and electrical properties suitable for a wide range of applications. Exemplary uses for the crosslinked compositions include forming durable articles, structured products, and electrical and electronics components. One advantage realized by these crosslinked compositions is their ability to withstand short term, high thermal loading while maintaining excellent flame retardant and mechanical properties.

The crosslinkable polyamide or polyester compositions can be crosslinked by an ionizing radiation such as beta or gamma radiation.

The non-halogenated polyamide compositions provided herein exhibit good flame retardant properties as evidenced by UL 94, Glow Wire Flammability Index, and Glow Wire Ignition Temperature results; as well as good electrical performance as evidenced by comparative tracking index results. These results render the compositions suitable for electrical appliances and electronics components, as well as appliance and transportation applications.

The terms "a" and "an" herein do not denote a limitation of quantity, but rather denote the presence of at least one of the referenced item. All ranges disclosed herein are inclusive and combinable.

The polyamide resins include a generic family of resins known as nylons, characterized by the presence of an amide group (—C(O)NH—). Nylon-6 and nylon-6,6 are suitable polyamide resins available from a variety of commercial sources. Other polyamides, however, such as nylon-4, nylon-4,6, nylon-12, nylon-6,10, nylon-6,9, nylon-6,12, nylon-9T, copolymer of nylon-6,6 and nylon-6, and others such as the amorphous nylons, may also be useful. Mixtures of various polyamides, as well as various polyamide copolymers, can be used.

The polyamides can be obtained by a number of well-known processes such as those described in U.S. Pat. Nos. 2,071,250; 2,071,251; 2,130,523; 2,130,948; 2,241,322; 2,312,966; and 2,512,606. Nylon-6, for example, is a polymerization product of caprolactam. Nylon-6,6 is a condensation product of adipic acid and 1,6-diaminohexane. Likewise, nylon 4,6 is a condensation product between adipic acid and 1,4-diaminobutane. Besides adipic acid, other useful diacids for the preparation of nylons include azelaic acid, sebacic acid, dodecane diacid, as well as terephthalic and isophthalic acids, and the like. Other useful diamines include m-xylyene diamine, di-(4-aminophenyl)methane, di-(4-aminocyclohexyl)methane; 2,2-di-(4-aminophenyl)propane, 2,2-di-(4-aminocyclohexyl)propane, among others. Copolymers of caprolactam with diacids and diamines are also useful.

It is also to be understood that the use of the term "polyamides" herein is intended to include the toughened or super tough polyamides. Super tough polyamides, or super tough nylons, as they are more commonly known, such as those available commercially, e.g. from E.I. duPont under the trade name ZYTEL ST, or those prepared in accordance with U.S. Pat. No. 4,174,358 to Epstein; U.S. Pat. No. 4,474,927 to Novak; U.S. Pat. No. 4,346,194 to Roura; and U.S. Pat. No. 4,251,644 to Jeffrion, among others and combinations comprising at least one of the foregoing, can be employed.

Generally, these super tough nylons are prepared by blending one or more polyamides with one or more polymeric or copolymeric elastomeric toughening agents. Suitable toughening agents are disclosed in the above-identified U.S. patents as well as in U.S. Pat. No. 3,884,882 to Caywood, Jr., U.S. Pat. No. 4,147,740 to Swiger et al.; and "Preparation and Reactions of Epoxy-Modified Polyethylene", J. Appl. Poly. Sci., V 27, pp. 425-437 (1982). Typically, these elastomeric polymers and copolymers may be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

The amount of polyamide present in the composition may be about 30 to about 96 weight percent, more specifically about 40 to about 80 weight percent, even more specifically about 50 to about 75 weight percent, or yet more specifically about 60 to about 70 weight percent based on the total weight of the composition.

Suitable polyesters include crystalline polyesters such as polyesters derived from an aliphatic or cycloaliphatic diols, or mixtures thereof, containing from 2 to about 10 carbon atoms and at least one aromatic dicarboxylic acid. Specific polyesters are derived from an aliphatic diol and an aromatic dicarboxylic acid having repeating units of the following general formula:

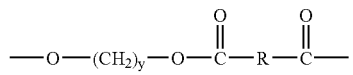

wherein y is an integer of from 2 to 6. R is a $C_6$-$C_{20}$ aryl radical comprising a decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, 4,4'-bisbenzoic acid and mixtures thereof. All of these acids contain at least one aromatic nucleus. Acids containing fused rings can also be present, such as in 1,4-, 1,5-, or 2,6-naphthalenedicarboxylic acids. Exemplary dicarboxcylic acids are terephthalic acid, isophthalic acid, naphthalene dicarboxcylic acid or mixtures thereof.

Exemplary polyesters are poly(ethylene terephthalate) ("PET"), and poly(1,4-butylene terephthalate), ("PBT"), poly(ethylene naphthanoate) ("PEN"), poly(butylene naphthanoate), ("PBN") and poly(propylene terephthalate) ("PPT").

Also contemplated herein are the above polyesters with minor amounts, e.g., from about 0.5 to about 5 percent by weight, of units derived from aliphatic acid and/or aliphatic polyols to form copolyesters. The aliphatic polyols include glycols, such as poly(ethylene glycol). Such polyesters can be made following the teachings of, for example, U.S. Pat. Nos. 2,465,319 and 3,047,539.

An exemplary poly(1,4-butylene terephthalate) resin that can be used herein is one obtained by polymerizing a glycol component of at least 70 mol %, specifically at least 80 mol %, of which consists of tetramethylene glycol and an acid component at least 70 mol %, specifically at least 80 mol %, of which consists of terephthalic acid, or polyester-forming derivatives therefore.

The polyesters used herein have an intrinsic viscosity of from about 0.4 to about 2.0 dl/gas measured in a 60:40 phenol/tetrachloroethane mixture or similar solvent at 23°-30° C. VALOX® 315 polyester available from GE Plastics is suitable having an intrinsic viscosity of 1.1 to 1.4 dl/g.

Blends of polyesters may also be employed in the composition. A blended polyester can include the combination of poly(ethylene terephthalate) and poly(1,4-butylene terephthalate). When blends of these components are employed the polyester resin component can comprise from about 1 to about 99 parts by weight poly(ethylene terephthalate) and from about 99 to about 1 part by weight poly(1,4-butylene terephthalate) based on 100 parts by weight of both components combined.

The amount of polyester present in the composition can be about 30 to about 96 weight percent, more specifically about 40 to about 80 weight percent, even more specifically about 50 to about 75 weight percent, or yet more specifically about 60 to about 70 weight percent based on the total weight of the composition.

The composition further comprises a crosslinking agent capable of crosslinking the polymer chains to produce a crosslinked polyamide or crosslinked polyester composition. Suitable crosslinking agents include those that can form free radicals under beta or gamma radiation. The crosslinking agents can contain two or more unsaturated groups including olefin groups. Suitable unsaturated groups include acryloyl, methacryloyl, vinyl, allyl, and the like. Exemplary polyallylic compounds useful as crosslinking agents include those compounds comprising two or more allylic groups, for example, triallylisocyanurate (TAIC), triallylcyanurate (TAC), and the like, and combinations thereof.

As used herein, "(meth)acryloyl" is inclusive of both acryloyl and methacryloyl functionality. The crosslinking agents can include polyol poly(meth)acrylates, which are typically prepared from aliphatic diols, triols and/or tetraols containing 2-100 carbon atoms. Examples of suitable polyol poly(meth)acrylates include ethyleneglycol diacrylate, 1,6-hexanediol diacrylate, neopentylglycol di(meth)acrylate, ethyleneglycol dimethacrylate (EDMA), polyethyleneglycol di(meth)acrylates, polypropyleneglycol di(meth)acrylates, polybutyleneglycol di(meth)acrylates, 2,2-bis(4-(meth)acryloxyethoxyphenyl) propane, 2,2-bis(4-(meth)acryloxydiethoxyphenyl) propane, pentaerythritol tri(meth)acrylate, pentaerythritol tetra(meth)acrylate, dipentaerythritol penta(meth)acrylate, dipentaerythritol hexa(meth)acrylate, trimethylolpropane trimethacrylate, trimethylolpropane triacrylate (TMPTA), di(trimethylolpropane) tetra(meth)acrylate, and the like, and combinations thereof. Also included are N,N'-alkylenebisacrylamides.

The amount of crosslinking agent present in the composition may be about 0.01 to about 20 weight percent, more specifically about 0.1 to about 15 weight percent, even more specifically about 1 to about 10 weight percent, or yet more specifically about 2 to about 7 weight percent based on the total weight of the composition.

The composition further comprises a flame retardant system, wherein the flame retardant system comprises phosphinate metal salts and/or diphosphinate metal salts. Suitable phosphinate metal salts and diphosphinate metal salts include, for example a phosphinate of the formula (I), a diphosphinate of the formula (II), polymers of the foregoing, or a combination thereof

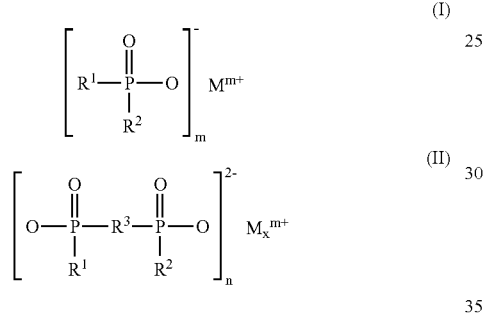

wherein $R^1$ and $R^2$ are each independently hydrogen, a linear or branched $C_1$-$C_6$ alkyl radical, or aryl radical; $R^3$ is a linear or branched $C_1$-$C_{10}$ alkylene, arylene, alkylarylene, or arylalkylene radical; M is calcium, aluminum, magnesium, strontium, barium, or zinc; m is 2 or 3; n is 1 when x is 1 and m is 2; n is 3 when x is 2 and m is 3. Exemplary salts include Exolit OP1230 by Clariant.

"Phosphinic salt" or "phosphinate" as used herein includes salts of phosphinic and diphosphinic acids and polymers thereof. Exemplary phosphinic acids as a constituent of the phosphinic salts include dimethylphosphinic acid, ethylmethylphosphinic acid, diethylphosphinic acid, methyl-n-propylphosphinic acid, methanedi(methylphosphinic acid), benzene-1,4-(dimethylphosphinic acid), methylphenylphosphinic acid and diphenylphosphinic acid. The salts of the phosphinic acids of the invention can be prepared by known methods that are described in U.S. Pat. Nos. 5,780,534 and 6,013,707 to Kleiner et al.

Exemplary phosphinate metal salts and/or diphosphinate metal salts include aluminum salt of dimethylphosphinic acid, aluminum salt of methylethylphosphinic acid, aluminum salt of methylpropylphosphinic acid, and the like.

The flame retardant system can optionally contain at least one nitrogen compound selected from the group consisting of condensation products of melamine and/or reaction products of condensation products of melamine with phosphoric acid, and/or mixtures thereof, including for example melam, melem, melon, melamine, melamine cyanurate, melamine phosphate compounds, dimelamine phosphate and/or melamine pyrophosphate, melamine polyphosphate compounds, benzoguanamine compounds, terepthalic ester compounds of tris(hydroxyethyl)isocyanurate, allantoin compounds, glycoluril compounds, ammeline, ammelide, and combinations thereof.

Suitable nitrogen compounds include those of the formula (III) to (VIII) or combinations thereof

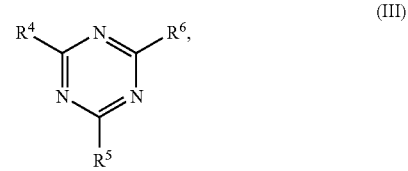

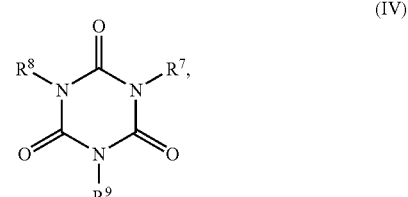

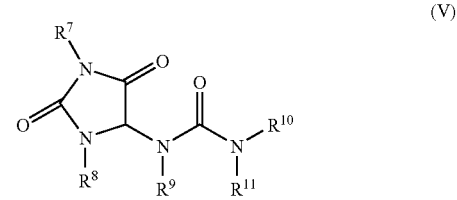

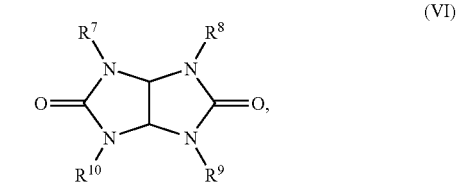

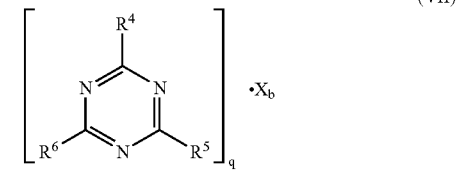

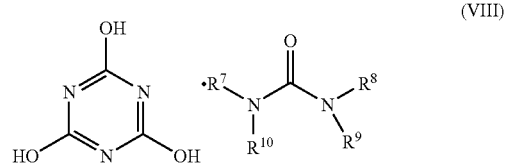

wherein $R^4$, $R^5$, and $R^6$ are independently hydrogen, hydroxy, amino, or mono- or di$C_1$-$C_8$alkyl amino; or $C_1$-$C_8$alkyl, $C_5$-$C_{16}$cycloalkyl, -alkylcycloalkyl, wherein each may be substituted by a hydroxyl or a $C_1$-$C_4$hydroxyalkyl, $C_2$-$C_8$alkenyl, $C_1$-$C_8$alkoxy, -acyl, -acyloxy, $C_6$-$C_2$aryl, —$OR^{12}$ and —$N(R^{12})R^{13}$ wherein $R^{12}$ and $R^{13}$ are each independently hydrogen, $C_1$-$C_8$alkyl, $C_5$-$C_{16}$cycloalkyl, or -alkylcycloalkyl; or are N-alicyclic or N-aromatic, where N-alicyclic denotes cyclic nitrogen containing compounds such as pyrrolidine, piperidine, imidazolidine, piperazine, and the like, and N-aromatic denotes nitrogen containing heteroaromatic ring compounds such as pyrrole, pyridine, imidazole, pyrazine, and the like; $R^7$, $R^8$, $R^9$, $R^{10}$ and $R^{11}$ are independently hydrogen, $C_1$-$C_8$alkyl, $C_5$-$C_{16}$cycloalkyl or -alkyl(cycloalkyl), each may be substituted by a hydroxyl or a $C_1$-$C_4$hydroxyalkyl, $C_2$-$C_8$alkenyl, $C_1$-$C_8$alkoxy, -acyl, -acyloxy, $C_6$-$C_{12}$aryl, and —O—$R^{12}$; X is phosphoric acid or pyrophosphoric acid; q is 1, 2, 3, or 4; and b is 1, 2, 3, or 4.

Exemplary nitrogen compounds include allantoin, benzoguanaine, glycoluril, melamine, melamine cyanurate, melamine phosphate, melamine pyrophosphate, melamine polyphosphate, urea cyanurate, and the like.

Suitable flame retardant systems containing phosphinate metal salts and/or diphosphinate metal salts and a nitrogen compound include Exolit OP1312 available from Clariant. Other exemplary flame retardant systems are disclosed in U.S. Pat. No. 6,365,071 to Jenewein et al.

The amount of flame retardant system present in the composition may be about 3 to about 30 weight percent based on the total weight of the composition, specifically about 5 to about 25, more specifically about 10 to about 20, and yet more specifically about 15 to about 18 weight percent. Within these amounts, the amount of the phosphinate metal salts and/or diphosphinate metal salts present in the flame retardant system can be about 1 to about 30 weight percent based on the total weight of the composition, specifically about 3 to about 25 weight percent, more specifically about 5 to about 20 weight percent, and yet more specifically about 8 to about 15 weight percent. Correspondingly, the amount of the nitrogen compound can be about 1 to about 25 weight percent based on the total weight of the composition, specifically about 3 to about 20 weight percent, more specifically about 5 to about 15 weight percent, and yet more specifically about 8 to about 10 weight percent.

The composition may optionally further comprise filler, including fibrous filler and/or low aspect ratio filler. Suitable fibrous filler may be any conventional filler used in polymeric resins and having an aspect ratio greater than 1. Such fillers may exist in the form of whiskers, needles, rods, tubes, strands, elongated platelets, lamellar platelets, ellipsoids, micro fibers, nanofibers and nanotubes, elongated fullerenes, and the like. Where such fillers exist in aggregate form, an aggregate having an aspect ratio greater than 1 will also suffice for the fibrous filler.

Suitable fibrous fillers include, for example, glass fibers, such as E, A, C, ECR, R, S, D, and NE glasses and quartz, and the like may be used as the reinforcing filler. Other suitable glass fibers include milled glass fiber, chopped glass fiber, and long glass fiber (for instance those used in a pultrusion process). Other suitable inorganic fibrous fillers include those derived from blends comprising at least one of aluminum silicates, aluminum oxides, magnesium oxides, and calcium sulfate hemihydrate. Also included among fibrous fillers are single crystal fibers or "whiskers" including silicon carbide, alumina, boron carbide, iron, nickel, or copper. Other suitable inorganic fibrous fillers include carbon fibers, stainless steel fibers, metal coated fibers, and the like.

In addition, organic reinforcing fibrous fillers may also be used including organic polymers capable of forming fibers. Illustrative examples of such organic fibrous fillers include poly(ether ketone), polyimide, polybenzoxazole, poly(phenylene sulfide), polycarbonate, aromatic polyamides including aramid, aromatic polyimides or polyetherimides, polytetrafluoroethylene, acrylic resins, and poly(vinyl alcohol). Such reinforcing fillers may be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture.

Non-limiting examples of low aspect fillers include silica powder, such as fused silica, crystalline silica, natural silica sand, and various silane-coated silicas; boron-nitride powder and boron-silicate powders; alkaline earth metal salts; alumina and magnesium oxide (or magnesia); wollastonite, including surface-treated wollastonite; calcium sulfate (as, for example, its anhydride, dihydrate or trihydrate); calcium carbonates including chalk, limestone, marble and synthetic, precipitated calcium carbonates, generally in the form of a ground particulate which often comprises 98+% $CaCO_3$ with the remainder being other inorganics such as magnesium carbonate, iron oxide and alumino-silicates; surface-treated calcium carbonates; other metal carbonates, for example magnesium carbonate, beryllium carbonate, strontium carbonate, barium carbonate, and radium carbonate; talc; glass powders; glass-ceramic powders; clay including calcined clay, for example kaolin, including hard, soft, calcined kaolin; mica; feldspar and nepheline syenite; salts or esters of orthosilicic acid and condensation products thereof; silicates including aluminosilicate, calcium silicate, and zirconium silicate; zeolites; quartz; quartzite; perlite; diatomaceous earth; silicon carbide; zinc sulfide; zinc oxide; zinc stannate; zinc hydroxystannate; zinc phosphate; zinc borate; aluminum phosphate; barium titanate; barium ferrite; barium sulfate and heavy spar; particulate aluminum, bronze, zinc, copper and nickel; carbon black, including conductive carbon black; flaked fillers such as glass flakes, flaked silicon carbide, aluminum diboride, aluminum flakes, and steel flakes; and the like. Examples of such fillers well known to the art include those described in "Plastic Additives Handbook, $4^{th}$ Edition" R. Gachter and H. Muller (eds.), P. P. Klemchuck (assoc. ed.) Hansen Publishers, New York 1993.

The total amount of filler, fibrous or low-aspect ratio filler, present in the composition may be about 0 to about 70 weight percent, more specifically about 5 to about 60 weight percent, or even more specifically about 15 to about 35 weight percent based on the total weight of the composition.

The composition may optionally further comprise other additives known in the art. Suitable additives include wear additives, for example, polytetrafluoroethylene (PTFE), molybdenum disulfide ($MoS_2$), graphite, aramide, carbon fibers, carbon powder, combinations comprising at least one of the foregoing wear additives, and the like. The amount of wear additive present in the composition may be about 0 to about 20 weight percent, more specifically about 1 to about 15 weight percent, or even more specifically about 5 to about 10 weight percent based on the total weight of the composition.

The composition may optionally further comprise an aromatic polymer including, for example, poly(arylene ether), polyetherimide, polyetherimide/polyimide copolymers, poly (arylene sulfide), polysulfone, polyethersulfone, polyeheretherketone, and combinations thereof. Suitable poly(arylene ether)s include homopolymers such as those containing 2,6-dimethylphenylene ether units, copolymers including random copolymers containing, for example, such units in combination with 2,3,6-trimethyl-1,4-phenylene ether units or copolymers derived from copolymerization of 2,6-dimethylphenol with 2,3,6-trimethylphenol, and the like. Suitable poly(arylene ether)s are described in U.S. Pat. No. 6,407,200 to Singh et al. and U.S. Pat. No. 6,437,084 to Birsak et al.

Suitable polyetherimides include those described in U.S. Pat. Nos. 3,847,867, 3,814,869, 3,850,885, 3,852,242, 3,855, 178, and 3,983,093.

When present, the aromatic polymer can be in amounts of about 1 to about 30 weight percent based on the total weight of the composition, specifically about 5 to about 25 weight percent, and yet more specifically about 10 to about 15 weight percent.

Other customary additives may be added to the resin compositions at the time of mixing or molding of the resin in amounts as necessary which do not have any deleterious effect on physical properties, specifically the flame retardant properties. For example, coloring agents (pigments or dyes), heat-resistant agents, oxidation inhibitors, weather-proofing agents, lubricants, mold release agents, plasticizer, and fluidity enhancing agents, and the like, may be added. Examples of pigments and dyes known to the art include those described in the chapter "Colorants" in "*Plastics Additives Handbook, 4th Edition*" R. Gachter and H. Muller (eds.), P. P. Klemchuck (assoc. ed.) Hansen Publishers, New York 1993. When used, the coloring agent may be present in an amount of up to about 5 weight percent based on the total weight of the composition, more specifically about 0.001 to about 2 weight percent, and yet more specifically about 0.01 to about 1 weight percent.

The preparation of the compositions may be achieved by blending the ingredients under conditions for the formation of an intimate blend. Such conditions often include mixing in single or twin-screw type extruders or similar mixing devices which can apply a shear to the components.

All of the ingredients may be added initially to the processing system, or else certain additives may be precompounded with one or more of the primary components. The other ingredients may include some of the polymer used to prepare the composition, while the remaining portion of the polymer is fed through a port downstream. While separate extruders may be used in the processing, these compositions can also be prepared by using a single extruder having multiple feed ports along its length to accommodate the addition of the various components. It is often advantageous to apply a vacuum to the melt through at least one or more vent ports in the extruder to remove volatile impurities in the composition. Those of ordinary skill in the art will be able to adjust blending times and temperatures, as well as component addition, without undue additional experimentation.

It should be clear that the invention encompasses reaction products of the above-described compositions, including the crosslinked products.

In one embodiment, a method of forming a crosslinkable, flame retardant composition comprises blending polyamide or polyether, a crosslinking agent, and a flame retardant system to form and intimate blend wherein the flame retardant system comprises a metal phosphinate salt, a metal diphosphinate salt, or combination thereof; and optionally at least one nitrogen compound. The method can further comprise a molding step to mold the intimate blend into an article. Additionally, the molded article can be crosslinked as described below.

In another embodiment, the compositions are used to prepare molded articles such as for example, durable articles, structural products, and electrical and electronic components, and the like. The compositions may be converted to articles using common thermoplastic processes such as film and sheet extrusion, injection molding, gas-assisted injection molding, extrusion molding, compression molding and blow molding. Film and sheet extrusion processes may include and are not limited to melt casting, blown film extrusion, and calendaring. Co-extrusion and lamination processes may be employed to form composite multi-layer films or sheets. Single or multiple layers of coatings may further be applied to the single or multi-layer substrates to impart additional properties such as scratch resistance, ultra violet light resistance, aesthetic appeal, and the like. Coatings may be applied through standard application techniques such as rolling, spraying, dipping, brushing, or flow-coating. Film and sheet of the invention may alternatively be prepared by casting a solution or suspension of the composition in a suitable solvent onto a substrate, belt or roll followed by removal of the solvent.

Also provided herein is a method of crosslinking the crosslinkable compositions. Specifically, the composition is formed or molded into an article and the article is exposed to an appropriate condition(s) to provide crosslinking. In one embodiment, the composition is crosslinked by ionizing radiation. Exemplary ionizing radiations include beta radiation (high energy electron beam) and gamma radiation (photon emitted by a radioactive source, e.g. Cobalt 60 or Cesium 137) at any dose sufficient to effect crosslinking. The polyamide compositions can be crosslinked at irradiation doses of about 75 to about 100 kilogray (kGy). The polyester compositions can be crosslinked at irradiation doses of about 250 to about 300 kGy.

In one embodiment, the crosslinked compositions prepared into 0.8 to 3.2 millimeters (mm) thick test specimens, exhibit a flammability class rating according to UL-94 of at least V2, more specifically at least V1, and yet more specifically at least V0.

In yet another embodiment, the crosslinked composition exhibits a comparative tracking index (CTI) measured according to International Electrotechnical Commission (IEC) standard IEC-60112/$3^{rd}$ using a test specimen having a thickness of 4.0 mm and a diameter of a minimum of 60.0 mm of greater than about 400 Volts, specifically greater than about 500 Volts. yet more specifically greater than about 550 Volts, and still yet more specifically greater than about 600 Volts. A tracking index of 400 to 599 Volts corresponds to class 1, and 600 Volts and greater is class 0.

In another embodiment, the crosslinked compositions have a Glow Wire Flammability Index (GWFI) as measured according to IEC-60695-2-1 of 960° C. at a test specimen thickness within the range of 0.8 to 3.2 millimeters thickness.

In yet another embodiment, the crosslinked compositions have a Glow Wire Ignition Temperature (GWIT) as measured according to IEC-60695-2-13 of 750° C. or greater at a test specimen thickness within the range of 0.8 to 3.2 millimeters, more specifically greater than about 800° C.

It should be clear that compositions and articles made from the compositions made by the method of this disclosure are within the scope of the invention. All cited patents, patent applications, and other references are incorporated herein by reference in their entirety. The invention is further illustrated by the following non-limiting examples.

EXAMPLES

The formulations for the following Examples were prepared from the components listed in Table 1 below.

TABLE 1

| Component | Trade Name; Supplier | Description |
| --- | --- | --- |
| PA6 2,4RV | Domamid 24; Domo | Polyamide-6 |
| PA66 2,7RV | PA66 27AE1; Rhodia | Polyamide-66 |
| TAIC | Triallylisocyanurate, Degussa | Crosslinking agent |
| Glass fiber | EC10-4.5mm-983; Vetrotex | Glass fiber |
| Melamine cyanurate | Melapur MC25, Ciba | Flame retardant |
| Melamine Polyphosphate | Melapur MC200, Ciba | Flame retardant |
| Component A | Exolit OP1312; Clariant | Flame retardant system containing a metal phosphinate salt and a nitrogen compound |
| Antioxidant | Irganox B1171, Ciba | Antioxidant |

TABLE 1-continued

| Component | Trade Name; Supplier | Description |
|---|---|---|
| Mold release | — | Aluminum stearate |
| Blue dye | Blue dye KG | Dye |
| Carbon Black | — | Colorant |

The formulations were compounded on a BC21 Clextral twin-screw extruder at a screw speed of 200 rpm and a throughput of 7 kilograms per hour (kg/h). Temperatures of about 240° C. were used for PA6; 260° C. for PA6/PA66; and 270° C. for PA66. The compounded formulations were then injection molded into test specimens and subsequently crosslinked with a beta ionizing radiation (electron beam) to form a crosslinked molded product. Irradiation doses in kilogray (kGy) are indicated when needed in the following tables. The compounded formulations were tested according to the tests described below.

Flammability tests were performed according to the procedure of Underwriters Laboratories Inc., Bulletin 94 entitled "Tests for Flammability of Plastic Materials for Parts in Devices and Appliances, UL94" using 1.6 mm and 3.2 mm test pieces in the vertical position. According to this procedure, the materials were classified as V-0, V-1, or V-2 on the basis of the test results.

The tensile modulus and tensile strength were measured by ISO Standard 527/1 using a test piece having a thickness of 4.0 mm. The units for tensile modulus is provided in Giga Pascal (GPa) and the units for tensile strength are provided in Mega Pascal (MPa). The tensile elongation at break was measured according to ISO 527 and the results are provided in percent.

The flexural strength and flexural modulus were measured according to ISO 178 and the results are provided in units of MPa.

The Izod notched impact was measured according to ISO 180-1A and the results are provided in units of kilojoules per squared meter (KJ/m$^2$). The Izod unnotched impact was measured according to ISO 180-1C and the results are provided in KJ/m$^2$.

The heat distortion temperature was measured according to ISO 75 and the results are provided in MPa.

The comparative tracking index (CTI) was measured according to International Electrotechnical Commission (IEC) standard IEC-60112/3$^{rd}$ using a test specimen having a thickness of 4.0 mm and a diameter of a minimum of 60.0 mm. A tracking index of 400 to 599 Volts corresponds to class 1, and 600 Volts and greater is class 0.

The Glow Wire Flammability Index (GWFI) was measured according to IEC-60695-2-1 using a specimen having a thickness of 1.6 mm and a dimension of 60.0 by 60.0 mm.

The Glow Wire Ignition Temperature (GWIT) was measured according to IEC-60695-2-13 using a specimen having a thickness 1.6 mm and a dimension of 60.0 by 60.0 mm.

Crosslinking is determined by a Hot Pin Test that measures the depth of penetration of a 1 mm diameter needle under 1 kilogram weight loading at 350° C. into a molded disk. The results were characterized by the following ratings: "0"=hot pin passes through a 1.6 mm plaque within 10 seconds; "2"=hot pin penetration is less than 0.5 mm after 15 seconds.

Table 2 contains the results of testing Comparative Examples (CE) of unfilled, crosslinkable polyamide compositions free of a flame retardant, both before and after crosslinking. Crosslinking is shown by the hot pin test results as well as the large increase in heat deflection temperature, Flexural properties, and Izod impact results. All amounts are in weight percent unless otherwise noted.

TABLE 2

| Component (wt %) | CE 1 | CE 2 | CE 3 |
|---|---|---|---|
| PA66 2.7 RV | 96.5 | 96.5 | 96.5 |
| TAIC | 3 | 3 | 3 |
| Antioxidant | 0.2 | 0.2 | 0.2 |
| Mold release | 0.3 | 0.3 | 0.3 |
| Irradiation dose (kGy) | 0 | 75 | 100 |
| Properties | | | |
| Tensile strength (MPa) | | | |
| Tensile elongation at break (%) | | | |
| Flexural strength | 104 ± 1 | 129 ± 2 | 132 ± 2 |
| Flexural modulus (MPa) | 3800 ± 50 | 4800 ± 100 | 4800 ± 100 |
| Izod Notched, +23° C. (kJ/m$^2$) | 2.3 ± 0.4 | 2.7 ± 0.4 | 2.7 ± 0.3 |
| Izod unnotched, +23° C. (kJ/m$^2$) | 22 ± 2 | 29 ± 2 | 30 ± 2 |
| Heat distortion temperature 1.82 MPa (° C.) | 175 ± 8 | 216 ± 4 | 216 ± 1 |
| UL 94 @ 1.6 mm thickness | — | — | — |
| UL 94 @ 3.2 mm thickness | — | — | — |
| GWFI @ 960° C. @ 1.6 mm | FAIL | FAIL | FAIL |
| GWFI @ 850° C. @ 1.6 mm | — | — | — |
| Hot pin test | 0 | 2 | 2 |
| CTI (volt) | — | — | — |

Table 3 provides test results of glass fiber reinforced crosslinkable and crosslinked polyamide compositions containing melamine cyanurate as the flame retardant. Again, crosslinking is demonstrated by the hot pin test result. Although the composition before irradiation shows reasonable flame retardancy under the UL 94 and GWFI results, crosslinking has a detrimental effect to these properties as shown by the results in Examples 5 and 6. NC stands for not classified.

TABLE 3

| Component (wt %) | CE 4 | CE 5 | CE 6 |
|---|---|---|---|
| PA6 2.4 RV | 61.5 | 61.5 | 61.5 |
| Glass fiber | 25 | 25 | 25 |
| Melamine Cyanurate | 10 | 10 | 10 |
| TAIC | 3 | 3 | 3 |
| Antioxidant | 0.2 | 0.2 | 0.2 |
| Mold release | 0.3 | 0.3 | 0.3 |
| Irradiation dose (kGy) | 0 | 75 | 100 |
| Properties | | | |
| Tensile strength (MPa) | 84 ± 1 | 107 ± 1 | 107 ± 2 |
| Tensile elongation at break (%) | 3.4 ± 0.1 | 2.8 ± 0.1 | 2.6 ± 0.2 |
| Flexural strength | 121 ± 1 | 155 ± 2 | 156 ± 3 |
| Flexural modulus (MPa) | 5000 ± 100 | 6600 ± 100 | 6600 ± 100 |
| Izod Notched, +23° C. (kJ/m$^2$) | 6.0 ± 0.5 | 4.6 ± 0.3 | 4.5 ± 0.2 |
| Izod unnotched, +23° C. (kJ/m$^2$) | 34 ± 3 | 35 ± 3 | 36 ± 2 |
| Heat distortion temperature 1.82 MPa (° C.) | 205 ± 1 | 219 ± 1 | 220 ± 1 |
| UL 94 @ 1.6 mm thickness | V2 | NC | NC |
| UL 94 @ 3.2 mm thickness | V2 | NC | NC |
| GWFI @ 960° C. @ 1.6 mm | PASS | FAIL | FAIL |
| GWFI @ 850° C. @ 1.6 mm | PASS | FAIL | FAIL |
| Hot pin test | 0 | 2 | 2 |
| CTI (volt) | 400 | 500 | 500 |

Table 4 provides test results of glass fiber reinforced crosslinkable and crosslinked polyamide compositions containing melamine polyphosphate as the flame retardant.

Again, crosslinking was found to have a detrimental effect to flame retardant properties as evidenced by the GWFI results for Example 9.

taining Component A, whereas a similar formulation based on melamine polyphosphate alone did not efficiently crosslink (see Table 4, Examples 7-12). It is also worthy of

TABLE 4

| Component (wt %) | CE 7 | CE 8 | CE 9 | CE 10 | CE 11 | CE 12 |
|---|---|---|---|---|---|---|
| PA66 2.7 RV | 24.5 | 24.5 | 24.5 | 24.5 | 24.5 | 24.5 |
| PA6 2.4 RV | 22 | 22 | 22 | 20 | 20 | 20 |
| Glass fiber | 25 | 25 | 25 | 25 | 25 | 25 |
| Melamine Polyphosphate | 25 | 25 | 25 | 25 | 25 | 25 |
| TAIC | 3 | 3 | 3 | 5 | 5 | 5 |
| Antioxidant | 0.2 | 0.2 | 0.2 | 0.2 | 0.2 | 0.2 |
| Mold release | 0.3 | 0.3 | 0.3 | 0.3 | 0.3 | 0.3 |
| Irradiation dose (kGy) | 0 | 75 | 100 | 0 | 75 | 100 |
| Properties | | | | | | |
| Tensile strength (MPa) | — | — | — | — | — | — |
| Tensile elongation at break (%) | — | — | — | — | — | — |
| Flexural strength | 149 ± 2 | — | 159 ± 2 | — | — | — |
| Flexural modulus (MPa) | 7300 ± 100 | — | 8000 ± 100 | — | — | — |
| Izod Notched, +23° C. (kJ/m$^2$) | 4.0 ± 0.2 | — | 4.0 ± 0.2 | — | — | — |
| Izod unnotched, +23° C. (kJ/m$^2$) | 28 ± 2 | — | 27 ± 2 | — | — | — |
| Heat distortion temperature 1.82 MPa (° C.) | 216 ± 1 | — | 216 ± 1 | 189 ± 2 | 212 ± 2 | 212 ± 2 |
| UL 94 @ 1.6 mm thickness | — | — | — | — | — | — |
| UL 94 @ 3.2 mm thickness | — | — | — | — | — | — |
| GWFI @ 960° C. @ 1.6 mm | PASS | — | FAIL | PASS | PASS | PASS |
| GWFI @ 850° C. @ 1.6 mm | PASS | — | FAIL | PASS | PASS | PASS |
| Hot pin test | 0 | 0 | 0 | 0 | 0 | 0 |
| CTI (volt) | 300 | 300 | 300 | 300 | 300 | 300 |

Table 5 provides the results of testing glass fiber reinforced crosslinkable and crosslinked polyamide compositions containing Component A, a flame retardant system comprising a metal phosphinate salt and a nitrogen compound. As illustrated by the results, it was surprisingly discovered that there was efficient radiation crosslinking with the formulation containing Component A, whereas a similar formulation based on melamine polyphosphate alone did not efficiently crosslink (see Table 4, Examples 7-12). It is also worthy of note that GWFI properties are maintained before and after irradiation and that GWIT results are improved for the crosslinked materials as compared to the non-irradiated samples. Similar results are confirmed by Examples 16-18, but with the presence of a color package.

TABLE 5

| Component (wt %) | 13 | 14 | 15 | 16 | 17 | 18 |
|---|---|---|---|---|---|---|
| PA66 2.7 RV | 26.5 | 26.5 | 26.5 | 26.5 | 26.5 | 26.5 |
| PA6 2.4 RV | 26 | 26 | 26 | 30.3 | 30.3 | 30.3 |
| Glass fiber | 25 | 25 | 25 | 20 | 20 | 20 |
| Component A | 17 | 17 | 17 | 17 | 17 | 17 |
| TAIC | 5 | 5 | 5 | 5 | 5 | 5 |
| Antioxidant | 0.2 | 0.2 | 0.2 | 0.2 | 0.2 | 0.2 |
| Mold release | 0.3 | 0.3 | 0.3 | 0.3 | 0.3 | 0.3 |
| Blue dye | — | — | — | 0.68 | 0.68 | 0.68 |
| Carbon black | — | — | — | 0.02 | 0.02 | 0.02 |
| Irradiation dose (kGy) | 0 | 75 | 100 | 0 | 75 | 100 |
| Properties | | | | | | |
| Tensile strength (MPa) | 107 ± 3 | 113 ± 2 | 114 ± 1 | 84 ± 1 | 88 ± 1 | 89 ± 2 |
| Tensile elongation at break (%) | 3.1 ± 0.1 | 2.6 ± 0.2 | 2.7 ± 0.1 | 2.1 ± 0.2 | 1.8 ± 0.1 | 1.8 ± 0.1 |
| Flexural strength | 155 ± 4 | 161 ± 5 | 164 ± 2 | 126 ± 2 | 133 ± 1 | 131 ± 3 |
| Flexural modulus (MPa) | 7500 ± 200 | 7900 ± 200 | 7800 ± 200 | 6000 ± 100 | 6400 ± 50 | 6400 ± 100 |

TABLE 5-continued

| Component (wt %) | 13 | 14 | 15 | 16 | 17 | 18 |
|---|---|---|---|---|---|---|
| Izod Notched, +23° C. (kJ/m$^2$) | 6.8 ± 0.4 | 6.4 ± 0.3 | 6.4 ± 0.4 | 2.4 ± 0.1 | 2.9 ± 0.1 | 3.0 ± 0.2 |
| Izod unnotched, +23° C. (kJ/m$^2$) | 41 ± 4 | 36 ± 3 | 37 ± 4 | 19 ± 1 | 20 ± 2 | 20 ± 1 |
| Heat distortion temperature 1.82 MPa (° C.) | 205 ± 1 | 211 ± 1 | 211 ± 1 | 189 ± 2 | 191 ± 1 | 192 ± 1 |
| UL 94 @ 1.6 mm thickness | V0 | V1 | NC | V0 | V0 | V0 |
| UL 94 @ 3.2 mm thickness | V0 | V0 | V0 | V0 | V0 | V0 |
| GWFI @ 960° C. @ 1.6 mm | PASS | PASS | PASS | PASS | PASS | PASS |
| GWFI @ 850° C. @ 1.6 mm | PASS | PASS | PASS | PASS | PASS | PASS |
| GWIT @ 1.6 mm | 750 | 800 | 800 | — | — | — |
| Hot pin test | 0 | 2 | 2 | 0 | 2 | 2 |
| CTI (volt) | 600 | 600 | 600 | 600 | 600 | 600 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A flame retardant composition, comprising:
   a polyamide;
   a crosslinking agent, wherein the crosslinking agent comprises two or more groups capable of forming free radicals under beta or gamma radiation; and
   a flame retardant system comprising a metal phosphinate salt, a metal diphosphinate salt, or combination thereof.

2. The composition of 1, wherein the metal phosphinate salt is of the formula (I) and the metal diphosphinate salt is of the formula (IN)

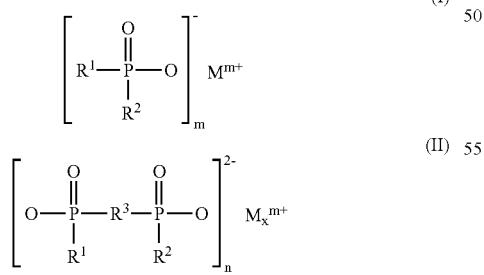

wherein R$^1$ and R$^2$ are each independently hydrogen, a linear or branched C$_1$-C$_6$ alkyl radical, or aryl radical; R$^3$ is a linear or branched C$_1$-C$_{10}$ alkylene, arylene, arylarylene, or arylalkylene radical; M is calcium, aluminum, magnesium, strontium, barium, or zinc; m is 2 or 3; n is 1 when x is 1 and m is 2; and n is 3 when x is 2and m is 3.

3. The composition of claim 1, wherein the metal salt is an aluminum salt of dimethylphosphinic acid, an aluminum salt of methylethylphosphinic acid, or an aluminum salt of methylpropylphosphinic acid.

4. The composition of claim 1, wherein the flame retardant system further comprises at least one nitrogen compound selected from the group consisting of condensation products of melamine and/or reaction products of condensation products of melamine with phosphoric acid, and/or mixtures thereof, melam, melem, melon, melamine, melamine cyanurate, melamine phosphate compounds, dimelamine phosphate, melamine pyrophosphate, melamine polyphosphate compounds, benzoguanamine compounds, terepthalic ester compounds of tris(hydroxyethyl)isocyanurate, allantoin compounds, glycoluril compounds, ammeline, ammelide, and combinations thereof.

5. The composition of claim 4, wherein the nitrogen compound comprises a compound of the formula (III) to (VIII) or combinations comprising at least one of the foregoing nitrogen compounds

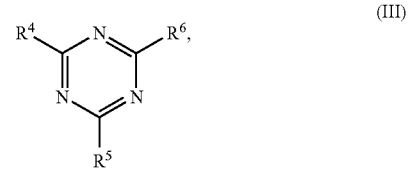

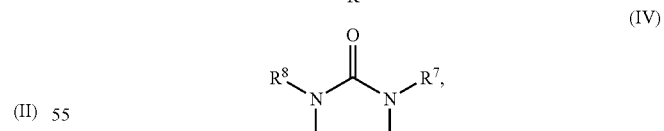

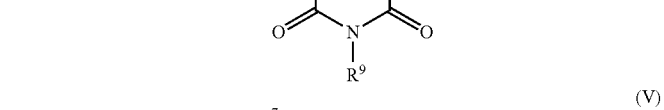

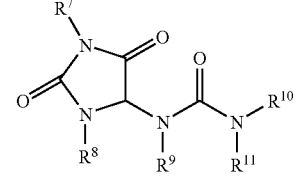

-continued

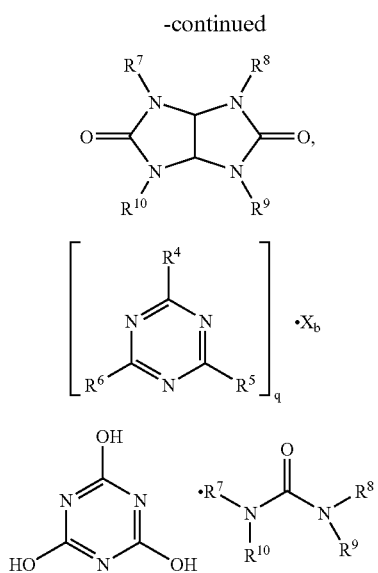

wherein $R^4$, $R^5$, and $R^6$ are independently hydrogen, hydroxy, amino, or mono- or di$C_1$-$C_8$alkyl amino; or $C_1$-$C_8$alkyl, $C_5$-$C_{16}$cycloalkyl, -alkylcycloalkyl, wherein each may be substituted by a hydroxyl or a $C_1$-$C_4$hydroxyalkyl, $C_2$-$C_8$alkenyl, $C_1$-$C_8$alkoxy, -acyl, -acyloxy, $C_6$-$C_{12}$aryl, —O$R^{12}$ an —N($R^2$)$R^{13}$ wherein $R^{12}$ and $R^{13}$ are each independently hydrogen, $C_1$-$C_8$alkyl, $C_5$-$C_{16}$cycloalkyl, or -alkylcycloalkyl; or are N-alicyclic or N-aromatic, where N-alicyclic denotes cyclic nitrogen containing compounds; $R^7$, $R^8$, $R^9$, $R^{10}$ and $R^{11}$ are independently hydrogen, $C_1$-$C_8$alkyl, $C_5$-$C_{16}$cycloalkyl or -alkylcycloalkyl, each may be substituted by a hydroxyl or a $C_1$-$C_4$hydroxyalkyl, $C_2$-$C_8$alkenyl, $C_1$-$C_8$alkoxy, -acyl, -acyloxy, $C_6$-$C_{12}$aryl, and —O—$R^{12}$; X is phosphoric acid, pyrophosphoric acid; q is 1, 2, 3, or 4; and b is 1, 2, 3, or 4.

6. The composition of claim 4, wherein the nitrogen compound is allantoin, benzoguanaine, glycoluril, melamine, melamine cyanurate, melamine phosphate, melamine pyrophosphate, melamine polyphosphate, or urea cyanurate.

7. The composition of claim 1, wherein the polyamide is selected from the group consisting of nylon-6, nylon-6,6, nylon-4, nylon-4,6, nylon-12, nylon-6,10, nylon-6,9, nylon-6,12, nylon-9T, copolymer of nylon-6,6 and nylon-6, polyamide copolymers, polyamide blends, and combinations thereof.

8. The composition of claim 1, wherein the polyamide is present in an amount of about 30 to about 96 weight percent based on the total weight of the composition.

9. The composition of claim 1, wherein the crosslinking agent comprises two or more unsaturated groups.

10. The composition of claim 1, wherein the crosslinking agent is a polyallylic compound or a polyol poly(meth)acrylate prepared from an aliphatic diol, triol, or tetraol containing 2-100 carbon atoms.

11. The composition of claim 1, further comprising up to about 60 weight percent of filler.

12. The composition of claim 11, wherein the filler is glass fiber, zinc borate, or a combination thereof.

13. The composition of claim 1, further comprising up to about 20 weight percent of a wear additive based on the total weight of the composition, wherein the wear additive is selected from the group consisting of polytetrafluoroethylene, molybdenum disulfide, graphite, aramide, carbon fiber, carbon powder, and combinations thereof.

14. The composition of claim 1, wherein the composition is crosslinked with ionizing radiation to form a crosslinked composition.

15. The composition of claim 14, wherein the composition after crosslinking exhibits at least one of the following:
  i) a rating of V0 according to UL-94 within the range of 0.8 to 3.2 millimeters thickness;
  ii) a Glow Wire Flammability Index as measured according to IEC-60695-2-1 of 960° C. or greater within the range of 0.8 to 3.2 millimeters thickness;
  iii) a Glow Wire Ignition Temperature as measured according to IEC-60695-2-13 of 750° C. or greater within the range of 0.8 to 3.2 millimeters thickness; or
  iv) a comparative tracking index measured according to International Electrotechnical Commission standard IEC-60112/3$^{rd}$ of class 1 or class 0.

16. An article comprising the crosslinked composition of claim 14.

17. A flame retardant composition, comprising:
  a polyamide;
  1 to about 20 weight percent of a polyallylic compound or a polyol poly(meth)acrylate crosslinking agent;
  about 5 to about 60 weight percent of glass fiber; and
  about 5 to about 25 weight percent of a flame retardant system comprising
    i) a metal phosphinate salt, a metal diphosphinate salt, or a combination thereof; and
    ii) optionally at least one nitrogen compound selected from the group consisting of condensation products of melamine and/or reaction products of condensation products of melamine with phosphoric acid, and/or mixtures thereof, melam, melem, melon, melamine cyanurate, melamine phosphate compounds, dimelamine phosphate, melamine pyrophosphate, benzoguanamine compounds, terepthalic ester compounds of tris(hydroxyethyl)isocyanurate, allantoin compounds, glycoluril compounds, ammeline, ammelide, and combinations thereof;
  wherein all the amounts are based upon the total weight of the composition.

18. The composition of claim 17, wherein the polyamide comprises about 15 to about 35 weight percent nylon-6 and about 15 to about 35 weight percent nylon-6,6;
  1 to about 10 weight percent of a crosslinking agent selected from the group consisting of triallylisocyanurate, triallylcyanurate, ethyleneglycol di(meth)acrylate, and trimethylolpropane tri(meth)acrylate;
  about 15 to about 30 weight percent of glass fiber; and
  about 10 to about 20 weight percent of the flame retardant system wherein the nitrogen compound is melamine, melamine phosphate, melamine pyrophosphate, or melamine polyphosphate;
  wherein all the amounts are based upon the total weight of the composition.

19. A method of forming a crosslinkable, flame retardant composition comprising:
  blending a polyamide, a crosslinking agent, wherein the crosslinking agent comprises two or more groups capable of forming free radicals under beta or gamma radiation; and
  a flame retardant system comprising
    i) a metal phosphinate salt, a metal diphosphinate salt, or combination thereof; and
    ii) optionally at least one nitrogen compound selected from the group consisting of condensation products of melamine and/or reaction products of condensation products of melamine with phosphoric acid, and/or mixtures thereof, melam, melem, melon, melamine, melamine cyanurate, melamine phosphate compounds, dimelamine phosphate, melamine pyrophosphate, melamine polyphosphate compounds, benzoguanamine compounds, terepthalic ester compounds of tris(hydroxyethyl)isocyanurate, allantoin compounds, glycoluril compounds, ammeline, ammelide, and combinations thereof, to form an intimate blend.

20. The method of claim 19, further comprising molding the intimate blend into an article and crossliriking the composition with ionizing radiation.

* * * * *